US009723010B2

(12) United States Patent
Kerr

(10) Patent No.: US 9,723,010 B2
(45) Date of Patent: Aug. 1, 2017

(54) PASSENGER SCREENING SYSTEM

(75) Inventor: Glenn M. Kerr, Davidsonville, MD (US)

(73) Assignee: International Business Machines Corporation, Armonk, NY (US)

( * ) Notice: Subject to any disclaimer, the term of this patent is extended or adjusted under 35 U.S.C. 154(b) by 2098 days.

(21) Appl. No.: 12/099,863

(22) Filed: Apr. 9, 2008

(65) Prior Publication Data

US 2009/0256675 A1   Oct. 15, 2009

(51) Int. Cl.
*H04L 29/06* (2006.01)
*G06Q 10/02* (2012.01)
*G06F 21/33* (2013.01)

(52) U.S. Cl.
CPC ............ *H04L 63/102* (2013.01); *G06F 21/33* (2013.01); *G06Q 10/02* (2013.01)

(58) Field of Classification Search
CPC .............................. G06Q 10/02; G06Q 20/341
USPC ....... 705/1.1, 5, 6; 340/5.8; 235/382; 726/19
See application file for complete search history.

(56) References Cited

U.S. PATENT DOCUMENTS

| 2003/0055689 | A1* | 3/2003 | Block ................... G06Q 10/02 705/5 |
| 2003/0158762 | A1* | 8/2003 | Wu .................................. 705/5 |
| 2003/0171939 | A1 | 9/2003 | Yagesh et al. |
| 2003/0225612 | A1 | 12/2003 | DeSimone et al. |
| 2004/0044664 | A1 | 3/2004 | Cash et al. |
| 2004/0103147 | A1 | 5/2004 | Flesher et al. |
| 2005/0005172 | A1* | 1/2005 | Haala ................... G06Q 20/341 726/19 |
| 2006/0190462 | A1 | 8/2006 | Bhri |
| 2006/0206351 | A1* | 9/2006 | Hodges ................. G06Q 10/02 705/5 |
| 2006/0293971 | A1* | 12/2006 | Hunter et al. .................. 705/26 |
| 2007/0219832 | A1* | 9/2007 | Willacy ................. G06Q 10/02 705/5 |

OTHER PUBLICATIONS

"CAPPS II: Myths and Facts", Feb. 13, 2003, Department of Homeland Security, 3 pgs.*
"Secure Flight Program", Aug. 7, 2007, Dept of Homeland Security, Transportation Security Administration, DHS, 49 CFR Parts 1540, 1544, and 1560, 137 pages.*

(Continued)

*Primary Examiner* — Kevin Flynn
*Assistant Examiner* — Freda A Nelson
(74) *Attorney, Agent, or Firm* — Daniel Simek; Hoffman Warnick LLC

(57) ABSTRACT

A system, method and program product for providing passenger screening. A method is disclosed that includes: providing a third party service to collect profile information from a user and provide the user with a unique ID; submitting the unique ID from the user to a reservation system when the user books a reservation; passing the unique ID from the reservation system to a government agency; submitting the unique ID from the government agency to the third party service and returning associated profile information to the government agency; checking the associated profile information against a watch list within the government agency and generating a screening level for the user; and communicating the screening level to a screening agent.

21 Claims, 2 Drawing Sheets

(56) References Cited

OTHER PUBLICATIONS

"DHS Fact Sheet: CAPPS II at a Glance", Feb. 12, 2004, dsh.gov, 2 pages.*
Simon, Harvey, "TSA Plans for Compatibility on Trusted Traveler" Technology; Dec. 4, 2002, vol. 1, No. 45, p. 4, (3 pgs).*
"Background Material on Biometrics and Enhanced Network Systems for the Security of International Travel", Dec. 23, 2004, Directorate for Science, Technology, and Industry, DSTI/ICCP/REG(2003)3/FINAL; 53 pgs.*
CAPPS II: Myths and Facts, Feb. 13, 2003, Department of Homeland Security, 3 pgs.*
"Aviation Security—Registered Traveler Program Policy and Implementation Issues"; GAO-Report to the Hon Kay Bailey Hutchison-Aviation Security, Nov. 2002, 41 pages.*
Singel, Ryan, "TSA Unveils Planned Overhaul of Airport Screening", Aug. 10, 2007; wired.com, 2 pages.*
Secure Flight Program, Aug. 7, 2007, Dept of Homeland Security, Transportation Security Administration, DHS, 49 CFR Parts 1540, 1544, and 1560, 137 pages.*
"Technical Interoperability Specification, Version 1.0 (Final)", Registered Traveler Interoperability Consortium, 2006, pp. 1-147.

* cited by examiner

PASSENGER SCREENING SYSTEM

FIELD OF THE INVENTION

This disclosure relates generally to travel watch lists and more particularly to a passenger controlled process to facilitate government watch list screening of the traveling public.

BACKGROUND OF THE INVENTION

In light of recent heightened security concerns, airlines are required to check passengers against government supplied watch lists. However, the watch list program has numerous challenges. One such issue is the fact that not all watch lists are released to the airlines for security concerns, so screening is often less than desirable. In particular, numerous employees throughout the airline industry have access to the watch lists, which creates a potential security leak.

Additionally, coordinating and synchronizing updates to each airline each day is a challenging task given the current technology infrastructure in the airline industry. Current systems were designed many years ago and cannot be easily modified to accommodate the ability to effectively cross reference passengers against watch lists. The result is an inconsistent implementation of watch list checks among the different airlines and airports, because each is responsible for implementing their own solution.

One proposed solution is that the airlines will supply passenger information to the government, and the government will be responsible for checking the passengers against watch lists. However, this solution is flawed for several reasons. Most airline reservation systems collect only minimal information about travelers, i.e., a name, a seat assignment, etc. However, in order to effectively screen passengers, additional information is required, such as a first, middle and last name, date of birth, address, etc. Current systems were not designed to accommodate this information. Performing a major overhaul of the reservation system would be both expensive and time consuming. Moreover, people are skeptical of giving the government personal data and travel plans of all citizens.

The lack of an effective approach to handling watch lists can thus lead to situations where individuals are misidentified as being on a watch list, passenger delays, security concerns, and escalating costs. Accordingly, a need exists to address the above issues.

SUMMARY OF THE INVENTION

The present invention relates to a system, method and program product for implementing passenger screening in the travel industry. In one embodiment, there is a method for screening passengers, comprising: providing a third party service to collect profile information from a user and provide the user with a unique ID; submitting the unique ID from the user to a reservation system when the user books a reservation; passing the unique ID form the reservation system to an agency; submitting the unique ID from the agency to the third party service and returning associated profile information to the agency; checking the associated profile information against a watch list within the agency and generating a screening level for the user; and communicating the screening level to a screening agent.

In a second embodiment, there is a computer readable medium having a program product for screening airline passengers, comprising: program code for collecting profile information from a user and for providing the user with a unique ID, wherein the unique ID can be presented to an airline reservation system when the user books a reservation; and program code that provides profile information to a government controlled watch list system in response to an inputted unique ID obtained from the airline reservation system.

In a third embodiment, there is a system for screening passengers, comprising: a traveler profile system having a registration system for collecting profile information from a user and providing the user with a unique ID; and a reservation system for creating travel reservations, wherein the reservation system includes: an input for receiving the unique ID; and a communication service for passing the unique ID to a watch list service and receiving a screening level for the user; wherein the traveler profile system further includes a data retrieval system for providing profile information for the user to the watch list service in response to obtaining the unique ID from the watch list service.

In a fourth embodiment, there is a method for deploying a system for screening passengers, comprising: providing a computer infrastructure being operable to: collect profile information from a user and for providing the user with a unique ID, wherein the unique ID can be presented to an airline reservation system when the user books a reservation; and provide profile information to a government controlled watch list system in response to an inputted unique ID obtained from the airline reservation system.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
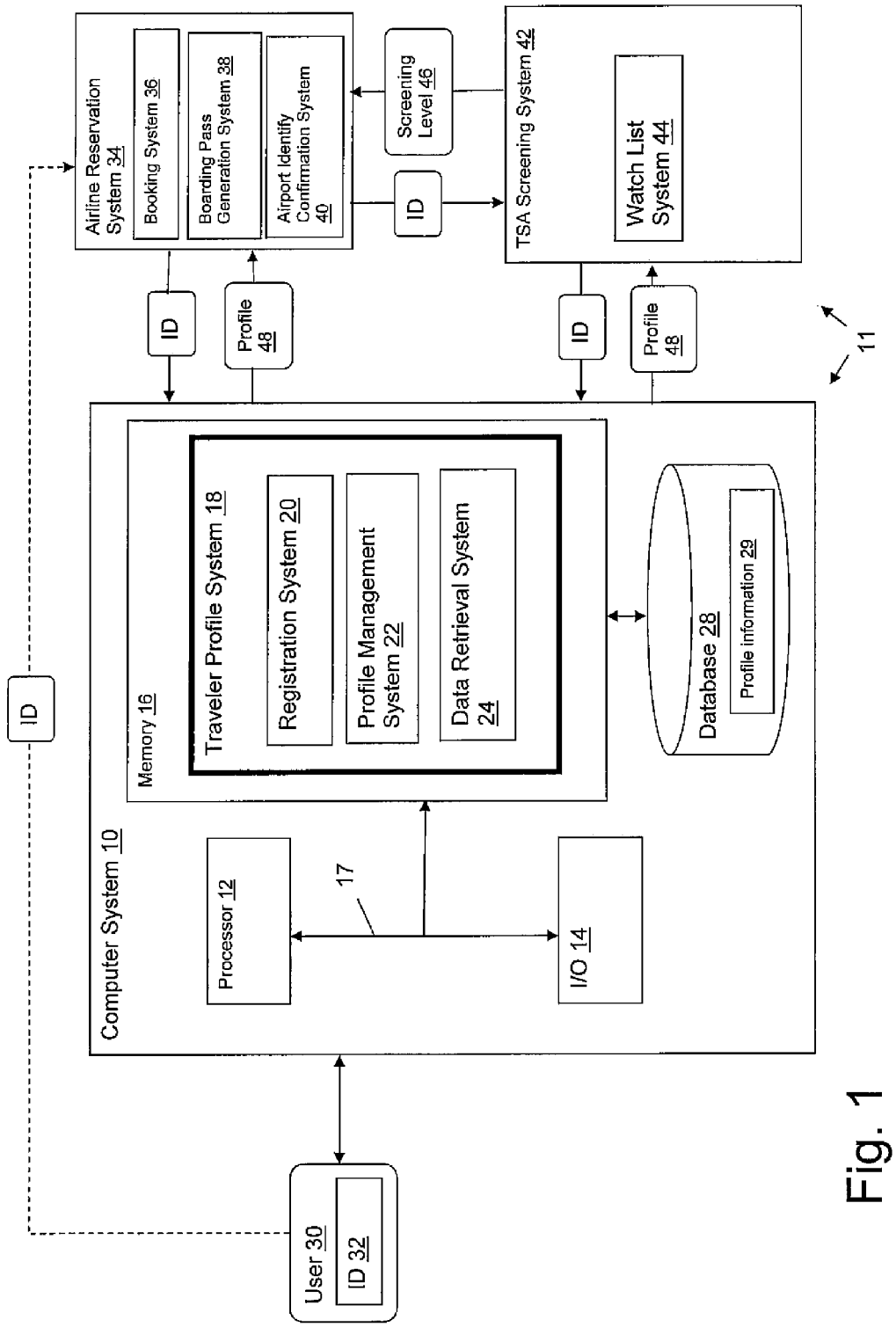
FIG. 1 depicts a screening infrastructure with a computer system having a traveler profile system 18 in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring to FIG. 1, an infrastructure 11 is shown for providing travel screening for airline passengers. Note that while this illustrative embodiment is directed to airline travel, the invention could be applied to any type of travel where screening is required. Infrastructure 11 generally includes a computer system 10 having a traveler profile system 18, an airline reservation system (ARS) 34 and a government controlled Transportation Security Administration (TSA) screening system 42.

Traveler profile system 18 may be implemented as a third party service that is completely voluntary to airline travelers. In particular, traveler profile system 18 includes a registration system 20 that allows a user 30 to register with the service in which profile information 29 of the user 30 is collected and stored in database 28. Profile information 29 may include, e.g., full name, address, date of birth, phone number, email, biometric data, and any other information that could be used to verify the identity of the user 30 relative to a watch list. When user 30 registers with the service, the user is given a unique ID 32 that can be used when making future reservations with an airline reservation system 34. Because only a single alphanumeric ID needs to be collected and stored by the airline reservation system 34 (similar to a frequent flier number) there is very little impact to the airline reservation system 34. Traveler profile system 18 also includes a profile management system 22, which allows the user 30 to update and modify his or her profile information 29. A data retrieval system 24 is also provided that allows either the airline reservation system 34 or the TSA screening system 42 to submit an ID and obtain a profile 48 associated with the ID. This would typically be done in a secure manner to avoid tampering.

In an illustrative embodiment, infrastructure 11 operates as follows. After user 30 voluntarily registers with the traveler profile system 18, the user 30 can provide their ID 32 to an airline reservation system 34 anytime thereafter when a reservation is being made via a booking system 36. Booking system 36 includes an input field or the like for receiving the ID from the user. The airline reservation system 34 then forwards the ID to the TSA screening system 42 sometime prior to the date of travel. This could be done via a communication channel in any manner, e.g., a batch mode, dynamically for each reservation when the boarding pass is issued, etc. Once the TSA screening system 42 receives the ID, TSA screening system 42 can forward the ID to the traveler profile system 18 to obtain a profile 48 of the user 30 via the data retrieval system 24. Once the TSA screening system 42 receives the profile 48, the profile 48 can be compared to one or more watch lists via watch list system 44. The result of the compare is a screening level 46 that should be applied to the user 30. Screening level 46 is thus returned to the airline reservation system 34, which can then e.g., print the screening level 46 on the user's boarding pass using boarding pass generation system 38. The screening level 46 may be printed in an encoded format on the boarding pass. Alternatively, the screening level 46 could be displayed on a display device available to TSA agents or airline personnel at the airport. The screening level 46 may indicate any information, e.g., a number code that correlates to a level of screening to be carried out on the passenger, such as perform a low risk screening, perform a heighten screening, etc. In the case where a user 30 voluntarily registers with the service, the typical result would be a low risk screening level.

In another application, TSA agents or airline personnel at the airport could directly submit an ID to the traveler profile system 18 via airport identify confirmation system 40 to obtain a profile 48 of a traveler and confirm their identity.

Infrastructure 11 provides numerous advantages including that fact that it can be implemented voluntarily. Passengers can register and store personal information about themselves and their family so airport security screening goes smoothly when they travel. It is also secure and simple. The airline knows where a user is going, but not necessarily who the user is (just an ID). The government learns who a user is and where the user is going only shortly before departure and has no need to warehouse user travel plans. Personal information is stored by a third party service, not the government. A passenger's personal information is only made available to the government for security screening purposes. Privacy safeguards can be put in place to ensure the government only obtains personal data shortly before travel, and does not retain the information past the travel dates. Moreover, provided information is retained by the traveler profile system 18 and can be used on subsequent travel; it does not have to be collected each time the user travels.

Figure 2:
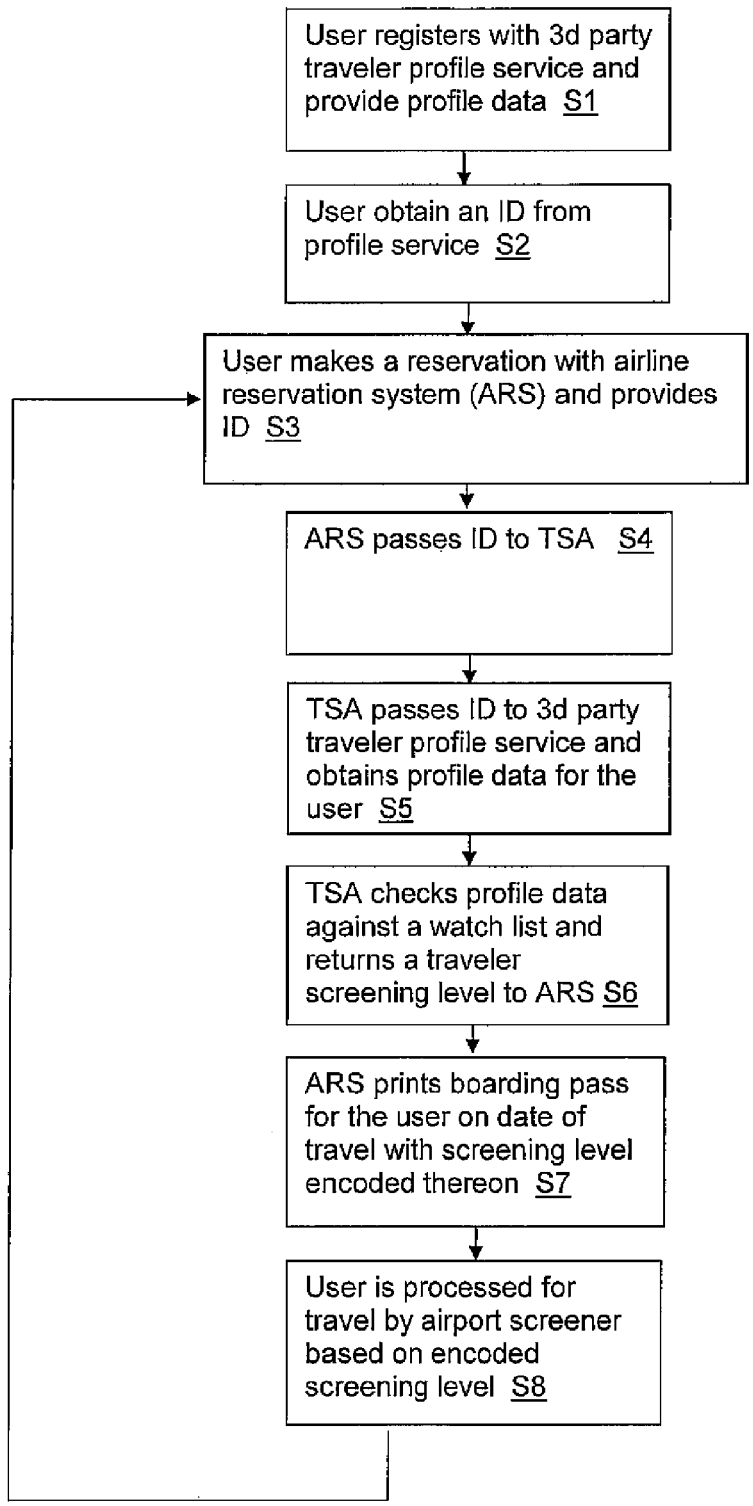
FIG. 2 depicts a flow diagram of implementing a travel screening infrastructure in accordance with an embodiment of the present invention.

FIG. 2 depicts a flow diagram of an illustrative method of implementing the infrastructure 11 described in FIG. 1. At S1, a user registers with a third party traveler profile service and obtains an ID at S2. At S3, the user makes a reservation with an ARS and provides the ID to the ARS. Next, at S4, the ARS passes the ID to the government controlled TSA. The TSA then passes the ID to the 3d party traveler profile service and obtains profile data for the user at S5. The TSA checks the profile data against a watch list and returns a traveler screening level to the ARS at S6. At S7, the ARS prints a boarding pass for the user on the date of travel with the screening level encoded thereon. The user is then processed at the airport by the airport screener based on the encoded screening level.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a traveler profile system 18 could be created, maintained and/or deployed by a service provider that offers the functions described herein for customers. That is, a service provider could offer to deploy or provide the ability to store profile data and associated user IDs as described above.

It is understood that in addition to being implemented as a system and method, the features may be provided as a program product stored on a computer-readable medium, which when executed, enables computer system 10 to provide a traveler profile system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for screening passengers, comprising:
providing a third party service to collect profile information from a user and provide the user with a unique ID;
submitting the unique ID from the user to a reservation system when the user books a reservation, wherein the reservation system collects only the unique ID for identification;
passing the unique ID from the reservation system to an agency in response to booking a reservation;
submitting the unique ID from the agency to the third party service and returning associated profile information to the agency;
checking, in response to the submitting, the associated profile information against a watch list within the agency and generating a screening level for the user based on the associated profile information and the watch list; and
communicating the screening level to a screening agent, wherein the screening level indicates a level of screening to be performed on the user.

2. The method of claim 1, wherein the reservation system includes an airline reservation system.

3. The method of claim 1, wherein the profile information includes a name and a date of birth.

4. The method of claim 1, wherein the profile information includes biometric data.

5. The method of claim 1, wherein the screening level is printed on a boarding pass.

6. The method of claim 1, wherein the agency is a government agency.

7. A non-transitory computer readable medium having a program product for screening airline passengers, comprising:
program code for collecting profile information from a user and for providing the user with a unique ID, wherein the unique ID can be presented to an airline reservation system when the user books a reservation; and
program code that provides profile information to a government controlled watch list system in response to an inputted unique ID obtained from the airline reservation system in response to the user booking the reservation, wherein the airline reservation system collects only the unique ID for identification, and wherein a screening level for the user is generated based on the profile information and the government controlled watch list, and wherein the screening level is communicated to a screening agent, wherein the screening level indicates a level of screening to be performed on the user.

8. The computer readable medium of claim 7, wherein the profile information includes a name and a date of birth.

9. The computer readable medium of claim 7, wherein the profile information includes biometric information.

10. The computer readable medium of claim 7, further comprising program code that provides profile information to the airline reservation system in response to an inputted unique ID.

11. A system for screening passengers, comprising:
a traveler profile system having a registration system for collecting profile information from a user and providing the user with a unique ID; and
a reservation system for creating travel reservations, wherein the reservation system includes:

an input for receiving the unique ID during the creation of the travel reservations, wherein the reservation system collects only the unique ID for identification; and a communication service for passing the unique ID to a watch list service, in response to the receiving the unique ID, and receiving a screening level for the user based on the unique ID and the watch list and communicating the screening level to a screening agent, wherein the screening level indicates a level of screening to be performed on the user;

wherein the traveler profile system further includes a data retrieval system for providing profile information for the user to the watch list service in response to obtaining the unique ID from the watch list service in response to creating the travel reservations.

12. The system of claim 11, wherein the traveler profile system further includes a profile management system for allowing the user to manage profile information.

13. The system of claim 11, wherein the reservation system includes an airline reservation system.

14. The system of claim 11, wherein the reservation system further includes an identity confirmation system that can submit the unique ID to the traveler profile system and obtain profile information of the user.

15. The system of claim 11, wherein the reservation system further includes a boarding pass generation system that can print the screening level on a boarding pass.

16. The system of claim 15, wherein the screening level is encoded.

17. The system of claim 11, wherein the profile information includes a name and a date of birth.

18. The system of claim 11, wherein the profile information includes biometric information.

19. The system of claim 11, wherein the profile information includes an address and names of family members.

20. The system of claim 11, wherein the watch list service includes a government watch list service.

21. A method for screening passengers, comprising:
collecting, by a computer infrastructure comprising at least a memory and a processor, profile information from a user and providing the user with a unique ID, wherein the unique ID can be presented to an airline reservation system when the user books a reservation; and providing, by the computer infrastructure, profile information to a government controlled watch list system in response to an inputted unique ID obtained from the airline reservation system while the user books the reservation, wherein the airline reservation system collects only the unique ID for identification, and wherein a screening level for the user is generated based on the profile information and the government controlled watch list, and wherein the screening level is communicated to a screening agent, wherein the screening level indicates a level of screening to be performed on the user.

* * * * *